(12) United States Patent
Yanagibashi et al.

(10) Patent No.: US 6,854,762 B2
(45) Date of Patent: Feb. 15, 2005

(54) AIRBAG SYSTEM

(75) Inventors: Yoshitaka Yanagibashi, Saitama (JP); Takeyasu Itabashi, Saitama (JP); Takenori Yamamoto, Saitama (JP); Takeshi Kuroe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/255,676

(22) Filed: Sep. 27, 2002

(65) Prior Publication Data

US 2003/0137137 A1 Jul. 24, 2003

(30) Foreign Application Priority Data

Oct. 2, 2001 (JP) ........................................ 2001-306259

(51) Int. Cl.⁷ .............................................. B60R 21/16
(52) U.S. Cl. .................. 280/736; 280/730.1; 280/728.1
(58) Field of Search .......................... 280/730.1, 730.2, 280/736, 735, 742, 728.1

(56) References Cited

U.S. PATENT DOCUMENTS

| | | | | |
|---|---|---|---|---|
| 3,930,667 A | * | 1/1976 | Osuchowski et al. .... | 280/730.1 |
| 4,059,852 A | * | 11/1977 | Crane ............................ | 2/456 |
| 4,227,717 A | * | 10/1980 | Bouvier ...................... | 280/753 |
| 4,825,469 A | * | 5/1989 | Kincheloe ...................... | 2/456 |
| 5,486,019 A | * | 1/1996 | Chevroulet et al. ...... | 280/730.1 |
| 5,542,696 A | * | 8/1996 | Steffens et al. ........... | 280/730.2 |
| 5,769,452 A | * | 6/1998 | Yoshida ...................... | 280/735 |
| 5,967,545 A | * | 10/1999 | Iijima et al. .............. | 280/730.1 |
| 6,007,090 A | * | 12/1999 | Hosono et al. ........... | 280/730.2 |
| 6,113,132 A | * | 9/2000 | Saslecov ................... | 280/730.1 |
| 6,386,581 B1 | * | 5/2002 | Ohno .......................... | 280/735 |
| 2003/0030257 A1 | * | 2/2003 | Thomas et al. ........... | 280/730.2 |
| 2003/0141710 A1 | * | 7/2003 | Zahn et al. ................. | 280/742 |

FOREIGN PATENT DOCUMENTS

| | | | |
|---|---|---|---|
| DE | 2014048 | * | 10/1971 |
| JP | 08-301031 A | | 11/1996 |

* cited by examiner

*Primary Examiner*—Ruth Ilan
(74) *Attorney, Agent, or Firm*—Birch, Stewart, Kolasch & Birch, LLP

(57) ABSTRACT

To secure the capacity of an inflator for deploying an airbag even when the airbag unit is downsized due to a limitation with respect to the mounting space. An airbag unit is disposed at the front portion of a fuel tank of a motorcycle V. A pair of inflator units is disposed on the left side and the right side of the centerline L of the vehicle body in a symmetrical manner. The inflators stored in the respective inflator units are connected to the airbag unit via gas supply hoses. Accordingly, even when a space for storing an inflator having a sufficient capacity cannot be provided in the airbag unit, the airbag can reliably be deployed by merging a sufficient amount of gas supplied from the inflators of a plurality of inflator units without any problems.

4 Claims, 7 Drawing Sheets

AIRBAG SYSTEM

CROSS-REFERENCE TO RELATED APPLICATIONS

The present application claims priority under 35 USC 119 to Japanese Patent Application No. 2001-306259 filed on Oct. 2, 2001 the entire contents thereof is hereby incorporated by reference.

BACKGROUND OF THE INVENTION

1. Field of the Invention

The present invention relates to an airbag system including an airbag unit for storing a folded airbag and an inflator for generating gas for inflating the airbag.

2. Description of Background Art

Generally, an airbag module of an airbag system for vehicles includes a folded airbag and an inflator for generating gas stored therein, so that gas generated by the inflator is directly supplied into the airbag. In contrast thereto, in the case where the airbag module is required to be downsized due to a limitation of the mounting space, there is proposed an airbag system wherein only an airbag is stored in the airbag module and an inflator is disposed at a position away from the airbag module and is connected to the airbag module via a gas supply hose (See JP-A-301031/1996).

However, even in the case in which the inflator is disposed outside the air bag module, when the space for installing the inflator is small, an inflator having sufficient capacity cannot be provided, and consequently, there arises a problem that it is difficult to deploy a high-capacity air bag.

OBJECTS AND SUMMARY OF THE INVENTION

With such circumstances in view, it is an object of the present invention to secure a sufficient capacity of the inflator for deploying the airbag even when the airbag unit is downsized due to a limitation with respect to the mounting space.

In order to achieve the object described above, according to the present invention, there is provided an airbag system including an airbag unit for storing a folded airbag, and an inflator for generating gas for inflating the airbag wherein a plurality of inflators are dispersingly disposed over the vehicle body.

According to the construction described above, since a plurality of inflators for supplying gas to the airbag unit for storing a folded airbag are dispersingly disposed over the vehicle body, even when a space for storing an inflator having a sufficient capacity cannot be secured in the airbag unit, the airbag can be deployed without any problems.

The present invention provides an airbag system wherein an inflator is stored in the airbag unit, and the remaining inflators are disposed outside the airbag unit.

According to the construction described above, since an inflator is stored in the airbag unit, and the remaining inflators are disposed outside the airbag unit, the number or the size of the inflators to be disposed outside the airbag unit may be reduced by effectively utilizing the internal space of the airbag unit.

The present invention provides an airbag system wherein a plurality of inflators are disposed symmetrically with respect to the centerline of the vehicle body.

According to the construction described above, since a plurality of inflators are disposed symmetrically with respect to the centerline of the vehicle body, disruption of a lateral balance of the vehicle body due to the weight of the inflators may be prevented.

The present invention provides an airbag system wherein the inflators to be disposed outside the airbag unit are disposed in the vicinity of the center of gravity of the vehicle body, or at positions that are lower than the center of gravity.

According to the construction described above, since the inflators to be disposed outside the airbag unit are disposed in the vicinity of the center of gravity of the vehicle body, or at the positions lower than the center of gravity, an impairment of the maneuverability and stability of the vehicle due to the weight of the inflator may be minimized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to examples shown in attached drawings, embodiments of the present invention will be described.

Figure 1:
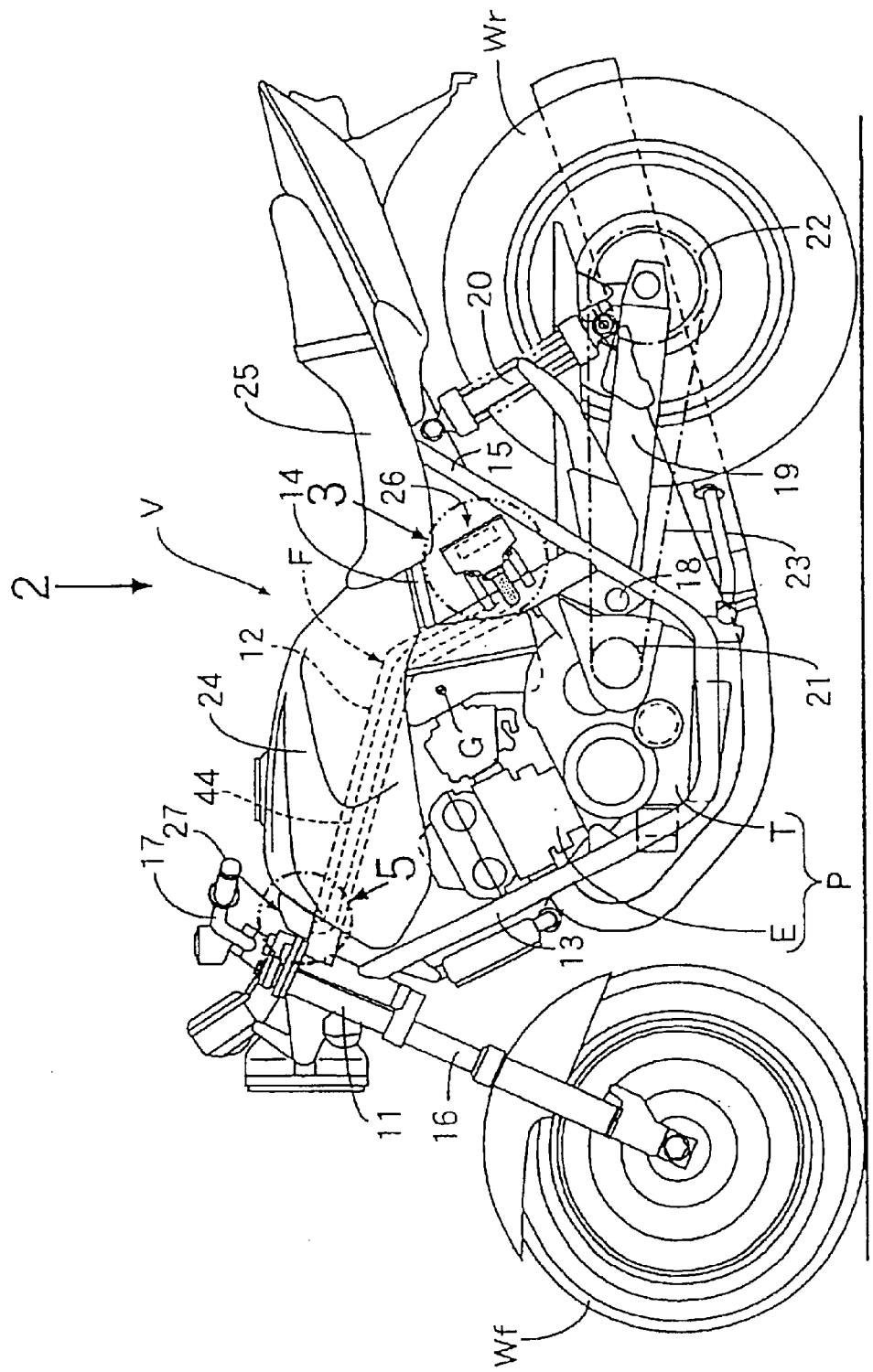
FIG. 1 is a side view showing the entire motorcycle having an airbag system mounted thereon.
Figure 2:
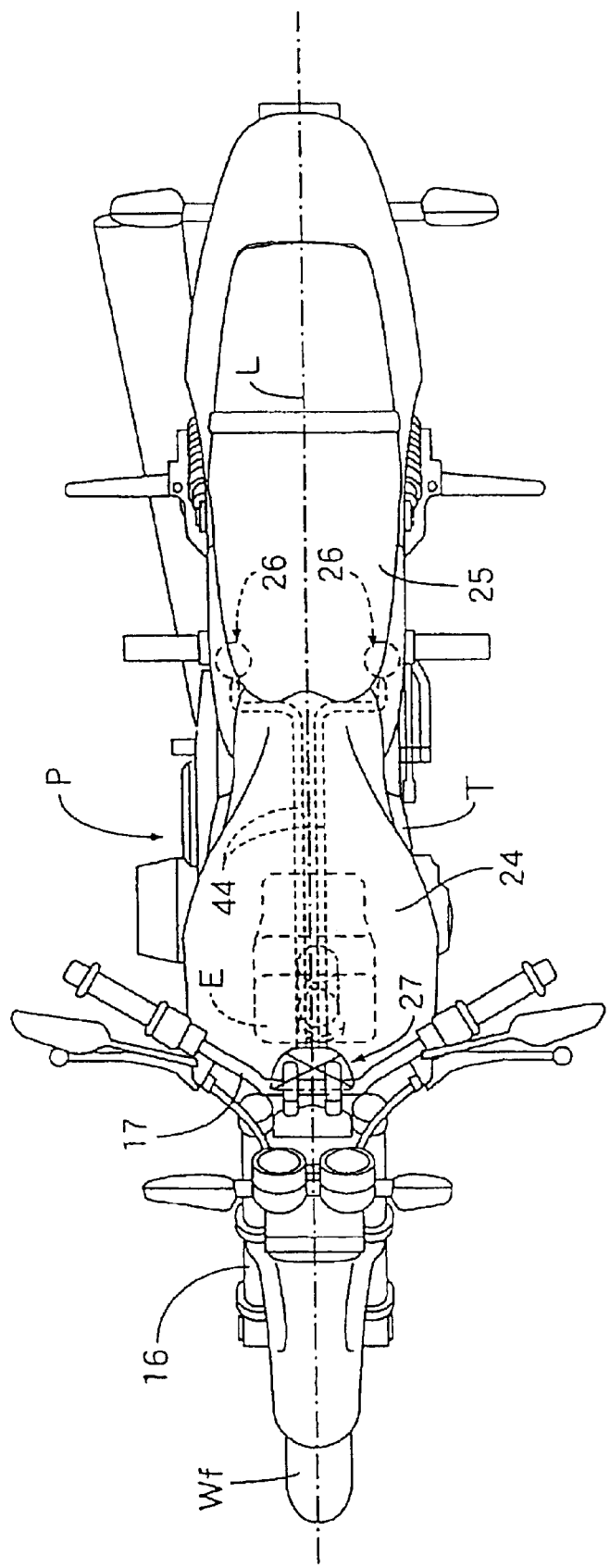
FIG. 2 is a drawing viewed from the direction shown by the arrow 2 in FIG. 1.

As shown in FIGS. 1 and 2, a vehicle body frame F of a motorcycle V includes a head pipe 11 with a main frame 12 extending from the head pipe 11 downwardly towards the rear that is bent at the midsection further downwardly. A down tube 13 extends from the head pipe 11 downwardly towards the rear that is bent at the midsection towards the rear. A seat rail 14 extends from the midsection of the main frame 12 towards the rear with a lower pipe 15 extending from the rear end of the down tube 13 upwardly towards the rear and connected to the midsection of the seat rail 14. A power unit P is provided that includes an engine E and a transmission T integrally formed with each other that are mounted in the space surrounded by the main frame 12, the down tube 13, and the lower pipe 15.

A front wheel Wf is rotatably supported at the lower end of a front fork 16 supported by the head pipe 11. A steering handle 17 is provided on the upper end thereof. The front end of a rear fork 19 is rotatably supported at the rear end of the main frame 12 via a pivot 18, and the portion in the vicinity of the rear end of the rear fork 19 on which a rear wheel Wr is rotatably supported is connected to the lower pipe 15 via a rear cushion 20. A driving sprocket 21 is provided on an output shaft of the transmission T and a driven sprocket 22 is provided on an axle of the rear wheel Wr. The driving sprocket 21 and the driven sprocket 22 are connected by an endless chain 23 with a driving force from the engine E being transmitted to the rear wheel Wr. A fuel tank 24 is provided upwardly of the power unit P so as to lie across the main frame 12. A seat 25 is supported by the seat rail 14 and is disposed rearwardly of the fuel tank 24.

The airbag system includes a pair of left and right inflator units 26, 26 disposed in the space surrounded by the main frame 12, the seat rail 14, and the lower pipe 15. An airbag unit 27 is disposed in the space surrounded by the head pipe 11 and the fuel tank 24.

Figure 3:
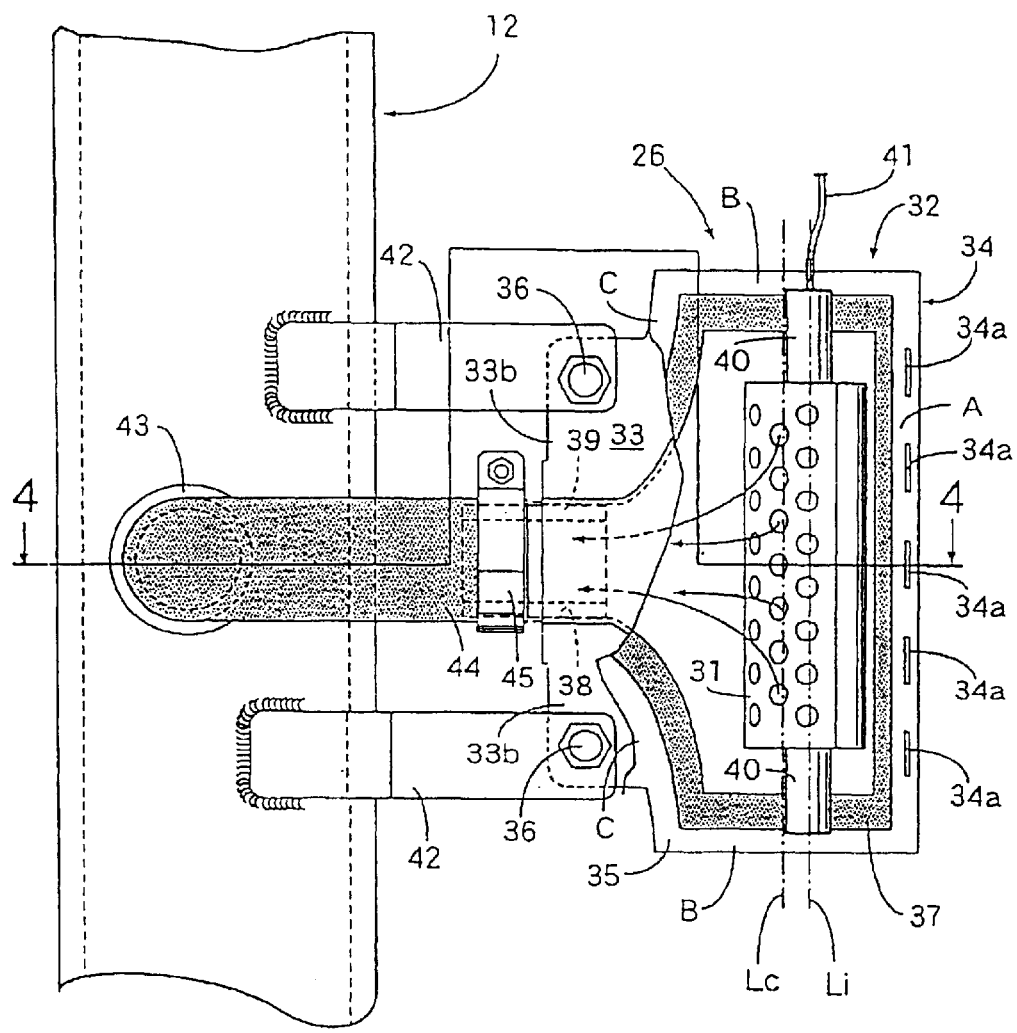
FIG. 3 is an enlarged cross sectional view showing the portion represented by the reference numeral 3 in FIG. 1.
Figure 4:
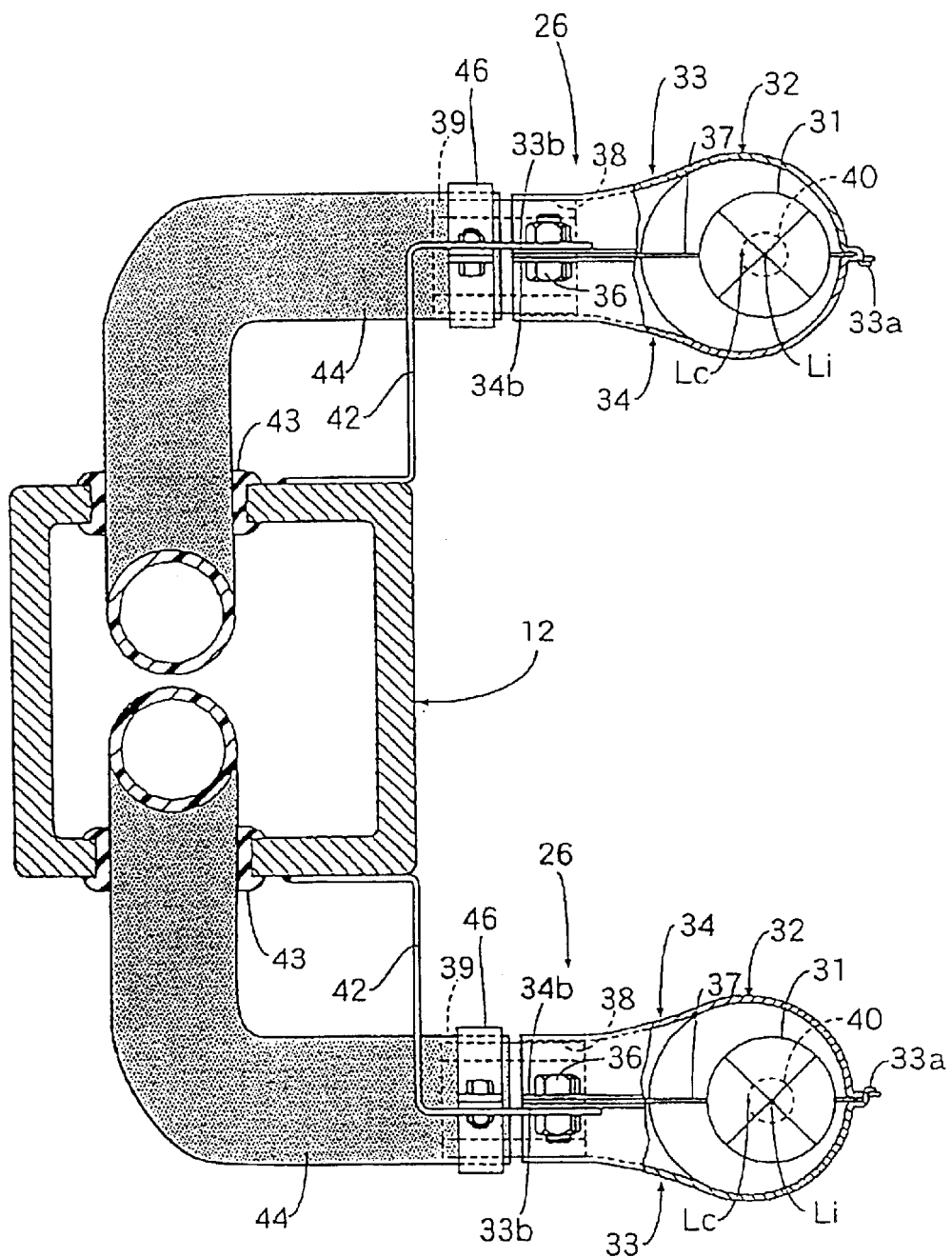
FIG. 4 is a cross sectional view taken along the line 4—4 in FIG. 3.

As is clear from FIG. 3 and FIG. 4, since the pair of left and right inflator units 26, 26 are symmetrical with respect to the centerline L of the vehicle body, the construction of the inflator unit 26 located on the left side of the vehicle body will mainly be described.

The inflator unit 26 is provided with an inflator case 32 for storing the inflator 31. The inflator case 32 is a substantially cylindrical member closed at both ends thereof that includes a left case half 33 and right case half 34 formed by pressing metal plates and joined the plates integrally along a flat parting plane 35. The parting plane 35 includes a first straight portion A extending in the direction of the axis Lc of the inflator case 32, a pair of second straight portions B, B extending in the direction orthogonal to the axis Lc of the inflator case 32 and continuing to both ends of the first straight portion A, and a pair of curved portions C, C continuing from the ends of the second straight portions B, B and extending in an arcuate shape to a direction away from the first straight portion A.

On the first straight portion A, a plurality of hooks 33a . . . (See FIG. 4) are formed on the left case half 33 for engaging a plurality of slits 34a . . . (See FIG. 3) formed on the right case half 34. The engaged portions serves as a hinge so that the left and right case halves 33, 34 can be opened and closed. The left and right case halves 33, 34 are provided with two fastening portions 33b, 33b; 34b, 34b continuing to the pair of curved portions C, C of the parting plane 35 towards the outside, so that the fastening portions 33b, 33b of the left case half 33 and the fastening portions 34b, 34b of the right case half 34 overlap with each other and are fastened by two bolts 36, 36. In this case, placing a flat sealing member 37 along the parting plane 35 seals the internal space of the inflator case 32. In the vicinity of the pair of curved portions C, C of the parting plane 35, the internal space of the inflator case 32 narrows in the shape of a funnel towards an exit opening 38 having a circular cross section, and the upstream end of a hose connecting pipe 39 is clamped and fixed at the exit opening 38.

The inflator 31 is filled with propellant for generating a gas when burned within a cylindrical member, and is fixed by interposing the pair of supporting portions 40, 40 projecting from both ends thereof in the axial direction between the second straight portions B, B of the parting plane 35 of the inflator case 32. In such a case, drawing a harness 41 continuing to the inflator 31 out of the inflator case 32 through the interior of the one of the supporting portions 40 eliminates the necessity of a specific grommet or the like for sealing the portion through which the harness 41 is drawn. Thus, the hermetic seal of the inflator case 32 can be enhanced while reducing the number of components. The axis Li of the inflator 31 is shifted towards the side opposite from the exit opening 38 (that is, on the side of the first straight portion A of the parting plane 35) with respect to the axis Lc of the inflator case 32.

Two stays 42, 42, welded to the main frame 12, are fastened to the fastening portions 33b, 33b; 34b, 34b of the left and right case halves 33, 34 together by means of two bolts 36, 36, whereby the inflator case 32 is fixed to the main frame 12. The proximal end of the gas supply hose 44 extends outwardly from the rubber bushing 43 provided at the opening formed on the side surface of the main frame 12. A gas supply hose 44 is fitted on the hose connecting pipe 39 and fixed by a fixing band 45.

The left and right inflator units 26, 26 are provided at positions symmetrical with respect to the centerline L of the vehicle body, and are positioned in the vicinity of the position of center of gravity G of the vehicle body or at positions lower than the position of the center of gravity G.

Figure 5:
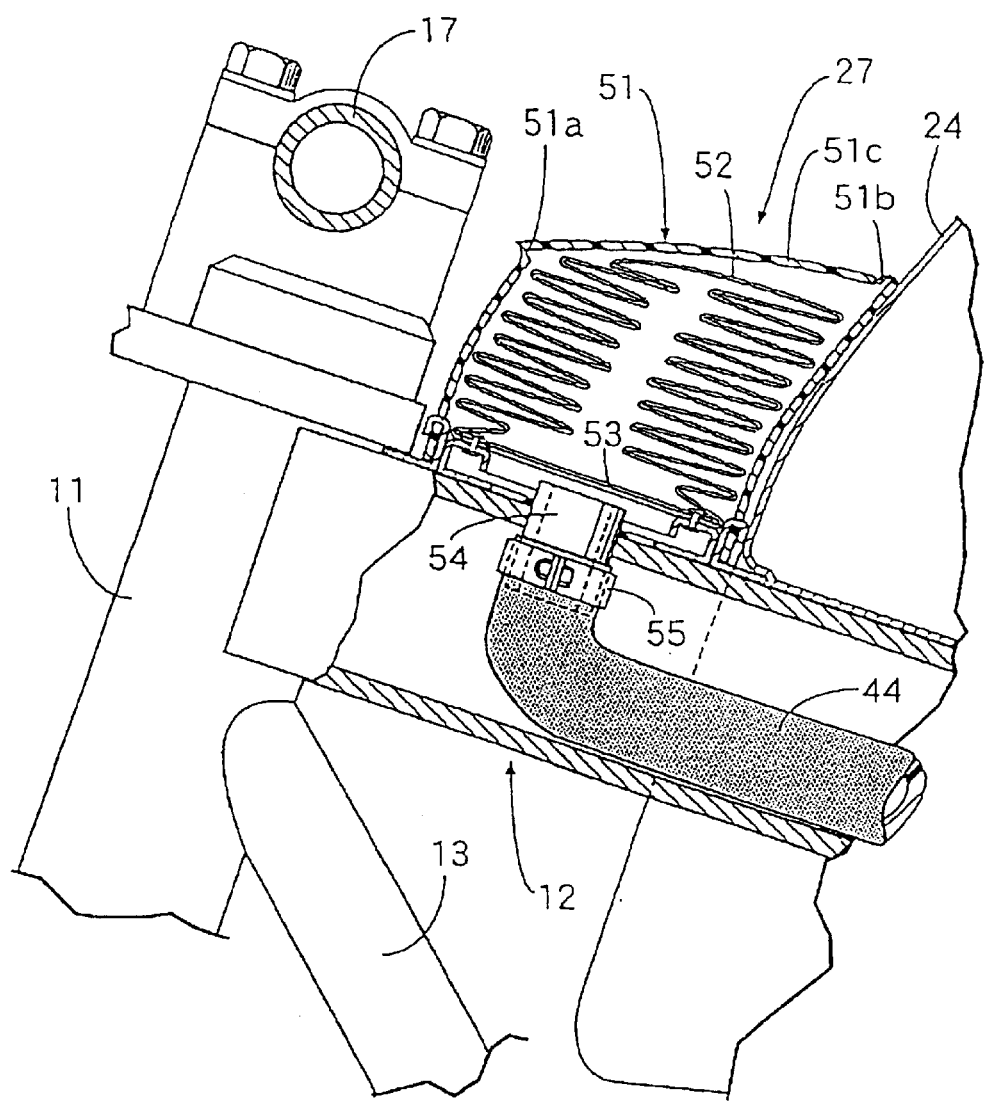
FIG. 5 is an enlarged cross sectional view of the portion represented by the reference numeral 5 in FIG. 1.

As is clear from FIG. 5, the airbag unit 27 is disposed on the upper surface of the main frame 12 so as to be interposed between the head pipe 11. The fuel tank 24 includes an airbag case 51 formed of synthetic resin with an airbag 52 stored in the folded state in the airbag case 51 and a retainer 53 fixed so as to surround two hose connecting pipes 54, 54 fixed through the upper surface of the main frame 12 for supporting the proximal portion of the airbag 52. The distal ends of the two gas supply hoses 44, 44 are stored in the main frame 12 and are fitted on the hose connecting pipes 54, 54, and fixed by bands 55, 55. Since the gas supply hoses 44, 44 are stored in the main frame 12, the gas supply hoses 44, 44 cannot be viewed from the outside, thereby improving the appearance. A hinge portion 51a is formed at the front edge of the airbag case 51, and thin breakable portions 51b are formed along three sides continuing to the hinge portion 51a, so that a lid 51c is defined at the portion surrounded by the hinge portion 51a and the breakable portions 51b.

Subsequently, the operation of the embodiment of the present invention having the aforementioned construction will be described.

Figure 6:
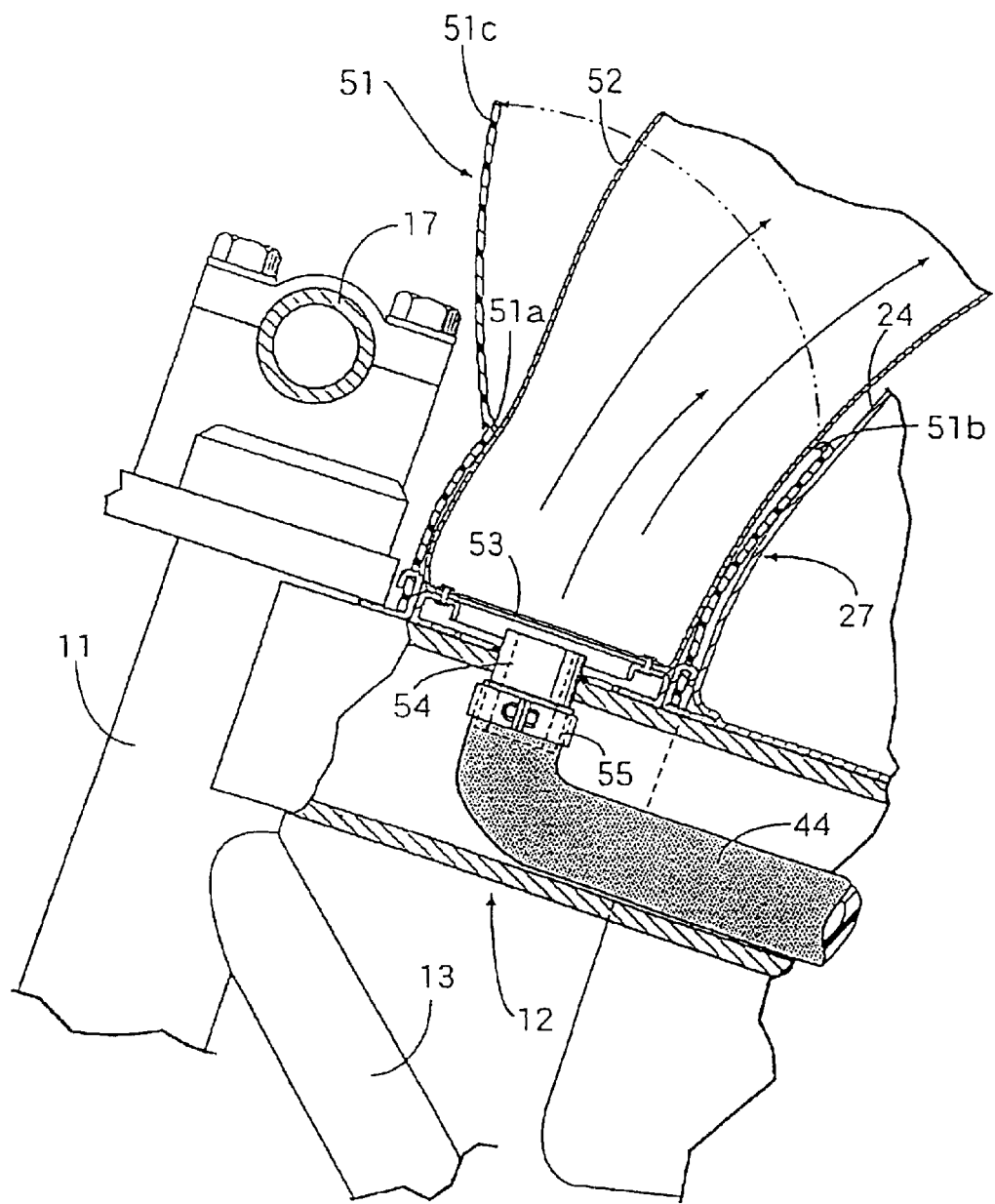
FIG. 6 is an explanatory drawing corresponding to FIG. 5, showing the operation.

When the motorcycle V is involved with a collision and an acceleration in excess of a prescribed value is detected by the acceleration sensor, not shown, the inflators 31, 31 stored in the inflator cases 32, 32 of the left and right inflator units 26, 26 are ignited to generate gas. The gas is guided along the inner surface of the inflator cases 32, 32 in a funnel shape, and is supplied from the hose connecting pipes 39, 39 supported at the exit openings 38, 38 to the two gas supply hoses 44, 44, and then flows from the hose connecting pipes 54, 54 of the air bag unit 27 into the interior of the airbag case 51 to inflate the airbag 52. As a consequent, as shown in FIG. 6, the breakable portions 51b of the airbag case 51 breaks, and the lid 51c is opened about the hinge portion 51a, and the airbag 52 is deployed through the opening formed thereon obliquely upwardly towards the occupant.

In this way, since the inflator case 32 for storing the inflator 31 is divided into the left case half 33 and the right case half 34 along the flat parting plane 35, storage and sealing of the inflator 31 can be achieved easily and reliably. In addition, since the pair of supporting portions 40 projecting from both ends of the inflator 31 are held and supported between the left case half 33 and the right case half 34, the inflator 31 can be supported easily, and the number of steps for assembling the inflator unit 26 can be reduced.

In addition, since the internal space of the inflator case 32 narrows towards the exit opening 38 in the funnel shape, gas generated by the inflator 31 can be introduced smoothly into the exit opening 38 without providing a specific straightening member such as a diffuser. Especially, since the axis Li of the inflator 31 is shifted towards the side opposite from the exit opening 38 with respect to the axis Lc of the inflator case 32, gas generated by the inflator 31 can be introduced smoothly towards the exit opening 38.

Since the airbag 52 is deployed by collecting gas from the two inflators 31, 31 provided outside the airbag unit 27, when no space can be secured for providing an inflator in the airbag unit 27, or even when a space for providing an inflator having sufficient capacity cannot be provided, the airbag 52 can reliably be deployed while generating a sufficient amount of gas. In addition, the two inflators 31, 31 are disposed symmetrically with respect to the centerline L of the vehicle body. Thus, the respective inflators 31, 31 can be downsized, and simultaneously, a lateral balance of the vehicle body can be maintained adequately. Further, since two inflators 31, 31 are disposed at the positions in the vicinity of the center of gravity G of the vehicle body or at positions lower than the center of gravity G, there is no possibility to impair maneuverability and stability of the motorcycle V.

Figure 7:
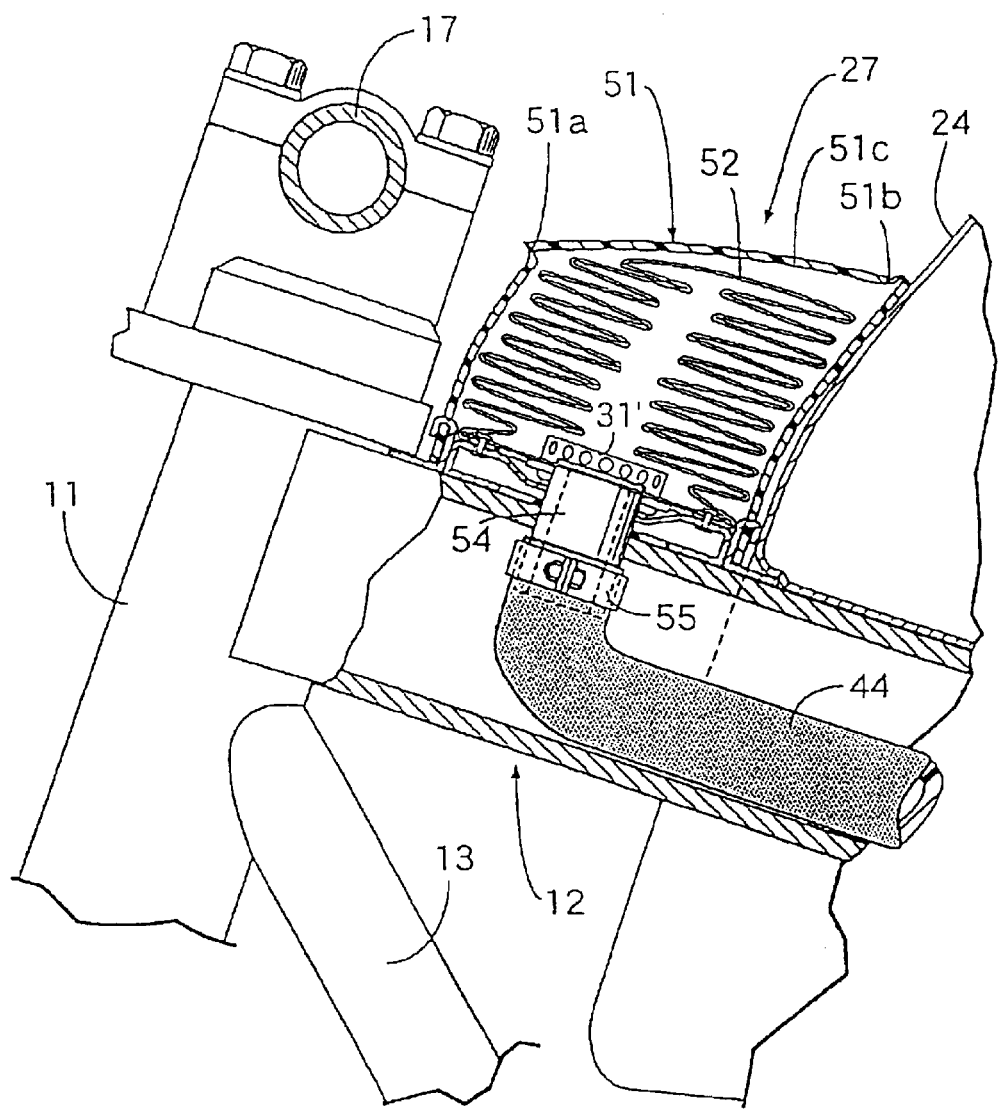
FIG. 7 is a drawing corresponding to the aforementioned FIG. 5 showing the second embodiment of the present invention.

Referring now to FIG. 7, a second embodiment of the present invention will be described.

While two inflators 31, 31 are provided outside the airbag unit 27 in the first embodiment, the third inflator 31' is provided inside the airbag unit 27, in addition to the aforementioned two inflators 31, 31 in the second embodiment. The inflator 31' is disposed at the center of the retainer 53 so as to be interposed between two hose. connecting pipes 54, 54, and the airbag 52 is deployed by gas generated by the three inflators 31, 31, 31' in total when the motorcycle V is involved in an accident.

According to the second embodiment, the provision of the additional inflator 31' inside the airbag unit 27 enables a downsizing of the inflators 31, 31 provided outside the airbag unit 27.

Though the embodiments of the present invention have been described thus far, various modifications in design may be made without departing from the scope of the invention.

For example, though two inflators 31, 31, or three inflators 31, 31, 31' are provided in the embodiments, it is also possible to provide at least four inflators. Though the inflator units 26, 26 are provided on the main frame 12 in the embodiments, they may be provided on other arbitrary positions (such as on the down tube 13). Though the airbag unit 27 is provided on the front portion of the fuel tank 24 in the embodiment, it may be provided on other arbitrary positions (for example, in the recess formed on the upper surface of the fuel tank 24).

As is described thus far, according to the present invention, since a plurality of inflators for supplying gas to the airbag unit for storing a folded airbag are dispersingly disposed over the vehicle body, even when a space for storing an inflator having sufficient capacity cannot be secured in the airbag unit, the airbag can be deployed without any problems.

According to the present invention, since an inflator is stored in the airbag unit, and the remaining inflators are disposed outside the airbag unit, the number or the size of the inflators to be disposed outside the airbag unit may be reduced by effectively utilizing the internal space of the airbag unit.

According to the present invention, since a plurality of inflators are disposed symmetrically with respect to the centerline of the vehicle body, a disruption of the lateral balance of the vehicle body due to the weight of the inflators may be prevented.

According to the present invention, since the inflators to be disposed outside the airbag unit are disposed in the vicinity of the center of gravity of the vehicle body, or at the positions lower than the center of gravity, impairment of the maneuverability and stability of the vehicle due to the weight of the inflator may be minimized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag system comprising:

an airbag unit for storing a folded airbag; and a plurality of inflators for generating gas for inflating the airbag;

said plurality of inflators are disposed at predetermined locations on a vehicle body with one inflator being stored in the airbag unit and the remaining inflators being disposed outside the airbag unit for selectively supplying gas to the airbag.

2. The airbag system according to claim 1, wherein the plurality of inflators are disposed symmetrically with respect to the centerline (L) of the vehicle body.

3. The airbag system according to claim 1, wherein the plurality of inflators that are disposed outside the airbag unit are disposed in the vicinity of the center of gravity (G) of the vehicle body, or at the positions lower than the center of gravity (G).

4. The airbag system according to claim 1, wherein the gas for the remaining inflators being disposed outside the airbag unit is supplied from gas supply hoses stored in a main frame of the vehicle.

* * * * *